(12) United States Patent
Muren

(10) Patent No.: US 9,156,548 B2
(45) Date of Patent: Oct. 13, 2015

(54) ROTOR ASSEMBLY

(75) Inventor: Petter Muren, Nesbru (NO)

(73) Assignee: Prox Dynamics AS, Nesbru (NO)

( * ) Notice: Subject to any disclaimer, the term of this patent is extended or adjusted under 35 U.S.C. 154(b) by 613 days.

(21) Appl. No.: 13/509,403

(22) PCT Filed: Nov. 15, 2010

(86) PCT No.: PCT/IB2010/003176
§ 371 (c)(1),
(2), (4) Date: May 11, 2012

(87) PCT Pub. No.: WO2011/058447
PCT Pub. Date: May 19, 2011

(65) Prior Publication Data
US 2012/0230824 A1    Sep. 13, 2012

(30) Foreign Application Priority Data
Nov. 12, 2009   (NO) .................................. 20093336

(51) Int. Cl.
B64C 27/605    (2006.01)
B64C 27/625    (2006.01)
A63H 27/00     (2006.01)

(52) U.S. Cl.
CPC .............. *B64C 27/605* (2013.01); *A63H 27/12* (2013.01); *B64C 27/625* (2013.01)

(58) Field of Classification Search
CPC ..... B64C 27/605; B64C 27/625; A63H 27/12
USPC ............ 416/114, 115, 116; 244/17.11, 17.25, 244/17.27
See application file for complete search history.

(56) References Cited

U.S. PATENT DOCUMENTS 3,106,964 A * 10/1963 Danielson et al. .............. 416/18
3,448,810 A *  6/1969 Vogt .............................. 416/127
4,027,999 A *  6/1977 Durno ............................ 416/40

(Continued)

FOREIGN PATENT DOCUMENTS

DE    202007000987 U1    4/2007
EP         2189201 A1    5/2010

(Continued)

OTHER PUBLICATIONS

International Search Report dated Aug. 2, 2011 for International Application Serial No. PCT/IB2010/003176, International Filing Date: Nov. 15, 2010 consisting of 4-pages.

*Primary Examiner* — Dwayne J White
*Assistant Examiner* — Brian P Wolcott
(74) *Attorney, Agent, or Firm* — Christopher & Weisberg, P.A.

(57) ABSTRACT

A rotor assembly for helicopter vehicles for stabilizing the aircraft and thus providing an easy way of controlling pitch and roll of the aircraft by respectively associated magnetic actuators. The rotor assembly comprises a rotor with two flexible rotor blades, a rotor head rotationally coupled to the rotor shaft, a rotating swash plate, with at least three fly bars extending therefrom. The swash plate is rotationally coupled to the rotor shaft and adjusted to tilt in all directions relative to a plane perpendicular to the rotor shaft. The rotor head is hinged to the rotor shaft in one direction so that the rotor head and the rotor blades jointly are not able to tilt around their transversal axis. The coupling between the rotating swash plate and the rotor head provide synchronized tilt movements between the rotor head and the rotating swash plate around the longitudinal axis of the rotor head.

6 Claims, 6 Drawing Sheets

(56) References Cited

U.S. PATENT DOCUMENTS

| | | | |
|---|---|---|---|
| 8,186,615 B2 * | 5/2012 | Uebori et al. | 244/17.25 |
| 2002/0109044 A1 * | 8/2002 | Rock | 244/17.23 |
| 2004/0184915 A1 * | 9/2004 | Kunii et al. | 416/114 |
| 2006/0102777 A1 * | 5/2006 | Rock | 244/17.25 |
| 2010/0130093 A1 * | 5/2010 | Van de Rostyne et al. | 446/37 |

FOREIGN PATENT DOCUMENTS

| | | |
|---|---|---|
| WO | 2009004705 A1 | 1/2009 |
| WO | 2009062407 A1 | 5/2009 |

* cited by examiner

ROTOR ASSEMBLY

CROSS-REFERENCE TO RELATED APPLICATION

This application is a U.S. National Stage application of and claims priority to International Application No. PCT/IB2010/003176, entitled ROTOR ASSEMBLY, filed on Nov. 15, 2010, which claims priority from Norwegian App. No. NO20093336, entitled ROTOR ASSEMBLY, filed on Nov. 12, 2009, the entirety of all of which is incorporated herein by reference.

FIELD OF THE INVENTION

The present invention relates to a rotor assembly for controlling pitch and roll on a passively stable helicopter.

BACKGROUND OF THE INVENTION

Typically, rotary wing aircrafts like helicopters are sustained by a rotor, rotating about a vertical rotor shaft, generating lift or upward thrust. In a conventional helicopter the thrust from the rotor can be controlled by changing the pitch angle (or in short: the blade pitch) of the rotor blades. The blade pitch is in the field of propeller aerodynamics defined as the lateral angle between the blades and a reference plane perpendicular to the rotor shaft axis, measured perpendicular to the longitudinal axis of a rotor blade.

By collectively changing the blade pitch of all the rotor blades or by changing the rotational speed of the rotor, the helicopter can be controlled in the vertical direction. The horizontal direction of flight and the stability of the helicopter, however, are controlled by cyclically adjusting the blade pitch of individual blades. Cyclically adjusting the pitch means that the blade pitch of each rotor blade is adjusted from a maximum in a particular position of rotation to a minimum at the opposite side. This causes the lift in one part of the rotation to be larger than in other parts, whereby the rotor is tilted with respect to the reference plane. When the rotor (and helicopter) tilts like this, the initially vertical thrust also tilts, and therefore gets a horizontal component pulling the helicopter in the desired direction.

Normally, a helicopter must be actively controlled by a well trained pilot or from gyroscopic sensors and computers. The necessary means to varying and controlling the pitch angle of each blade are normally complicated, expensive and add weight to the helicopter. The blade pitch is typically controlled via a swash plate connected to servos. Because the servos need to be positioned accurately in order to control the helicopter, they are complicated and expensive.

Using magnetic actuators would be a simpler and less expensive way of manipulating the swash plate to control blade pitch. Magnetic actuators, however, are ideal to control the actuation force but do not have the position accuracy normally required in a traditional helicopter rotor system. Some rotor systems also provide passive stability to the helicopter, but these systems are often difficult or impossible to combine with precise control over the blade pitch.

To maintain passive stability of a helicopter and at the same time allow precise control by using low cost magnetic actuators would require a completely new rotor system.

SUMMARY OF THE INVENTION

The present invention provides a rotor assembly with a rotor shaft and two flexible rotor blades coupled to a rotor head which in turn is rotationally coupled to the rotor shaft, each rotor blade extending outwards from the rotor shaft, comprising a rotating swash plate through which centre the rotor shaft runs, having at least three flybars extending from and being distributed around said centre provided with a weight element on respective outer tips, the swash plate being rotationally coupled to and synchronized with the rotor shaft and adjusted to tilt in all directions relative to a plane perpendicular to the rotor shaft, wherein the rotor head is hinged to the rotor shaft in one direction so that the rotor head and the rotor blades jointly are able to tilt around their concurrent longitudinal axis, but not around their traversal axis, and the rotating swash plate is coupled to the rotor head by two tilt links being hinged to both the rotating swash plate and the rotor head, one at each side of the longitudinal axis of the rotor head, providing synchronized tilt movements between the rotor head and the rotating swash plate around the longitudinal axis of the rotor head.

BRIEF DESCRIPTION OF THE DRAWINGS

The following detailed description of the preferred embodiment is accompanied by drawings in order to make it more readily understandable. In the drawings.

DETAILED DESCRIPTION OF THE INVENTION

In the following, the present invention will be discussed and example embodiments described by referring to the accompanying drawings. However, people skilled in the art will realize other applications and modifications within the scope of the invention as defined in the enclosed independent claims.

The present invention provides a rotor assembly for helicopter vehicles for stabilizing the aircraft and thus providing an easy way of controlling pitch and roll of the aircraft by respectively associated magnetic actuators. Pitch in this context means controlled movements in the forward/backward direction, and roll in the left/right directions of the aircraft. Note that "blade pitch" in this document refers to tilt movements around the longitudinal axis of a rotor blade, and is different to what is referred to as "pitch" only, as described above.

Figure 1:
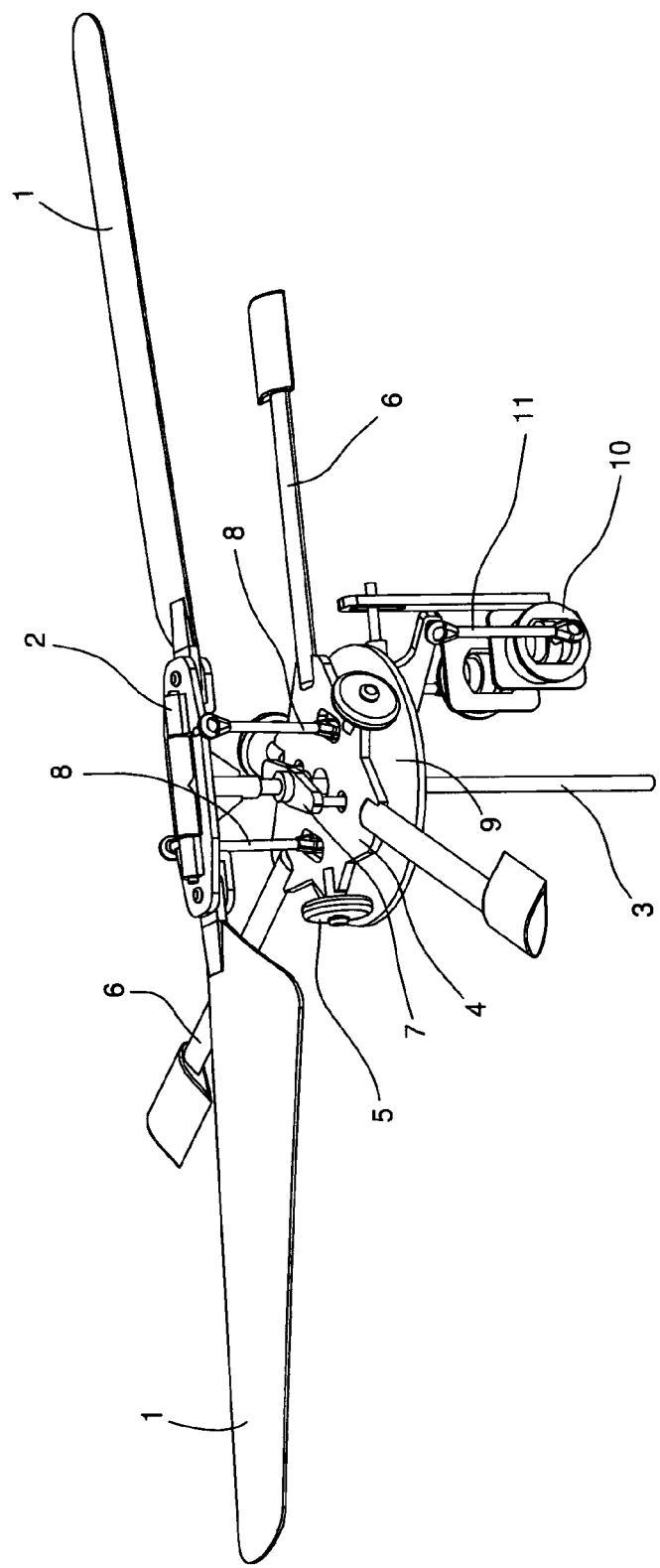
FIGS. 1 and 2 are illustrations of an example of a rotor assembly from two different views according to the present invention.
Figure 2:
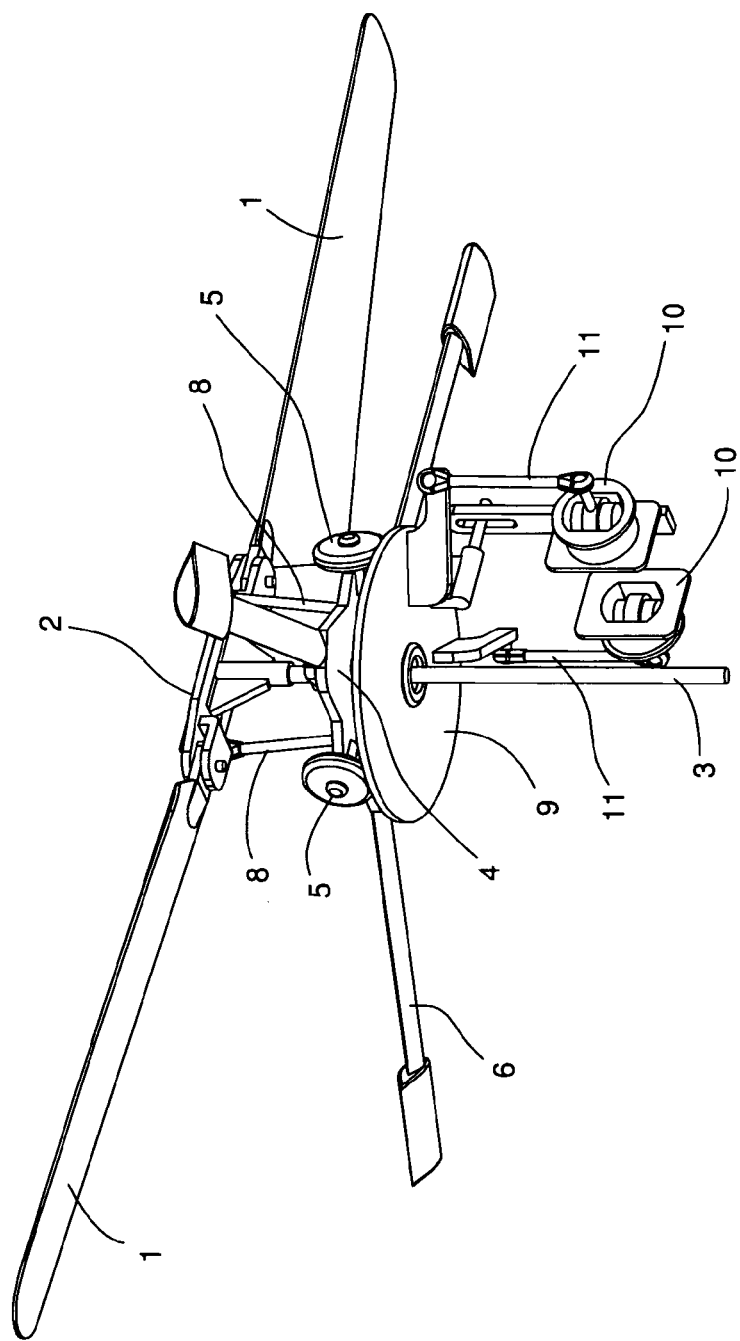
Figure 6:
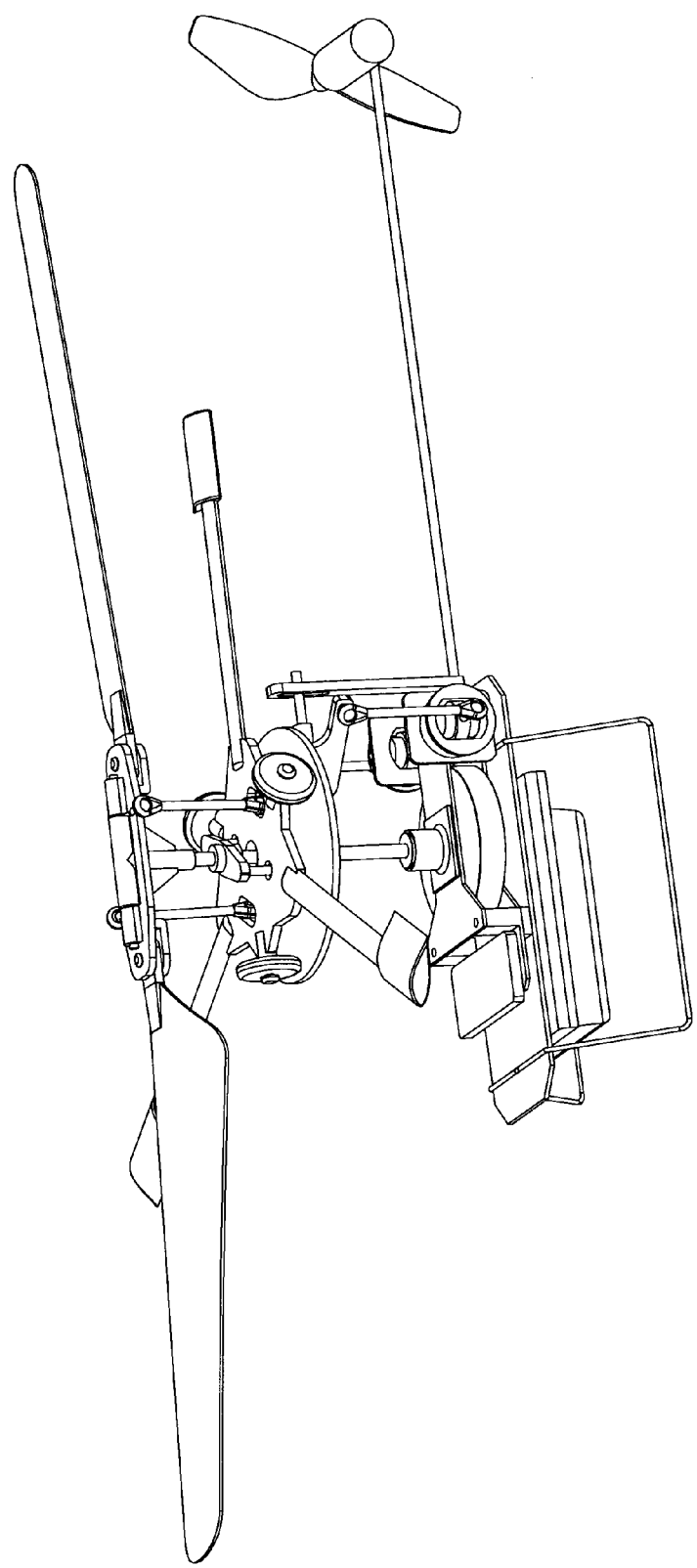
FIG. 6 is an indicative illustration of the rotor assembly according to the present invention mounted on a helicopter vehicle body.

In FIGS. 1 and 2, one embodiment of a rotor assembly according to the present invention is shown. In FIG. 6 the same rotor assembly is shown mounted on a helicopter vehicle body. The rotor itself consists of two rotor blades (1) connected in a rotor head (2). Each rotor blade (1) is preferably coupled to the rotor head (2) at its inner end via a hinged connection. The hinged connection couples the rotor blade (1) to the rotor head (2) with a pin or a screw. The inner end of the rotor blade (1) is arranged into the cleave-shaped end of the rotor head (2) and the pin or screw is penetrated through the cleave taps and the blade. In this way, the blades are able to rotate around the (initially vertical) axis of the pins or screws if the rotor is hit by a hard material in e.g. a crash, but still sufficiently fixed to the rotor head (2) so that the two blades and the rotor head (2) are lined up when the rotor is rotating. Other "crash-proof" ways of connecting the blades to the rotor head is of course also imaginable, e.g. a rigid 2-bladed rotor with a magnetic connector allowing the rotor to simply fall off in a controlled manner in a crash, and thereby preventing the blades and other parts to be damaged.

The rotor head (2) is mounted on top of rotor shaft (3). The coupling between the rotor head (2) and the rotor shaft (3) is hinged so that the rotor head (2) and consequently the rotor blades are free to rotate around their longitudinal axis for about 40 degrees. However, the coupling is fixed around the transversal axis of the rotor, allowing the rotor blades (1) to only tilt around its longitudinal axis but not around its transversal axis.

A rotating swash assembly is provided below the rotor. The rotating swash assembly comprises a rotating swash plate (4), three wheels (5) and three flybars (6). The three wheels (5) are rotary connected on the edge of the rotating swash plate (4), the rotating plane of the wheels (5) being perpendicularly to the rotating plane of the rotating swash plate (4). The flybars (6) are fixed to the edge of the rotating swash plate (4) extending outwards in the rotating plane of which. On the outer ends of the flybars (6) equally weighted flybar weights are provided. The number of wheels and flybars provided in the rotating swash assembly could vary, but they should be more than two and they should be uniformly or symmetrically distributed around the rotating swash plate (4). As mentioned, the flybars (6) are distributed in a plane, not just along an is axis which is the most common configuration. This configuration of the flybars (6) is important as it gives full gyroscopic stability to the swash plate assembly that is otherwise free to tilt in any direction.

The rotating swash assembly is connected to the rotor shaft (3) with a connection element (7) perpendicularly fixed to the rotor shaft (3) at the centre of the connection element (7) and one pin perpendicularly fixed at each end of the connection element (7), which in turn are perpendicularly connected to the rotating swash plate (4) of the rotating swash assembly. The rotor shaft (3) itself passes through the rotating swash assembly in a hole at the centre of the rotating swash plate (4). The central hole in the rotating swash plate (4) has a conical shape allowing the rotating swash plate (4) to be connected to the rotor shaft (3) but at the same time able to tilt freely in all directions.

The rotational movements of the rotating swash assembly and the rotor corresponds to the rotation of the rotor shaft (3), as both are connected to which. However, they are also directly connected by two tilt links (8). The tilt links (8) are coupled to the rotor head (2) by a hinge connection, each at opposite points of the centre of the rotor head (2). The tilt links (8) are also hinged to the rotating swash plate (4), each at opposite points of the centre of the swash plate (4). The tilt links (8) provide correspondence between a tilting movement of the rotating swash assembly and the tilt of the rotor (rotor head and rotor blades) around its longitudinal axis, called blade pitch. The two connection points of the tilt links (8) to the rotating swash plate (4) create an axis (the axis going trough the two connection points) with a certain angle related to the longitudinal axis of the rotor blades (1). This angle controls the position of maximum blade pitch relative to the maximum tilt of the swash assembly. In the embodiment of FIG. 1, this angle is about 30 degrees.

The rotating swash assembly lies upon a non-rotating swash plate (9). The non-rotating swash plate (9) is positioned so that the wheels (5) of the rotating swash assembly can touch the surface of the non-rotating swash plate (9), and can roll freely upon which. The rotating swash plate (4) and the non-rotating swash plate (9) are rotationally connected by a central flange extending downwards from the rotating swash plate (4) trough a central hole in the non-rotating swash plate (9). There should preferably be as little friction as possible between the flange and the non-rotating swash plate (9).

The non-rotating swash plate (9) is preferably coupled to, and rotationally stationary relative to, the aircraft equipped with the rotor assembly. However, the non-rotating swash plate (9) can be tilted in all directions. This tilting movement subsequently tilts the rotating swash plate (4) through their earlier indicated points of contacts on the wheels (5). In the same way will a tilting movement initiated in the rotating swash plate (4), by e.g. gyroscopic effects from the flybars (6) result in a corresponding tilting of the non-rotating swash plate (9).

The flybars (6) in combination with the simplified swash plate assembly of the present invention enables a helicopter to have passive stability (to maintain a more or less fixed position in the air without active control input from the pilot). Because the flybars (6) with the weighted tips act as a large gyroscope when they are rotating together with the rotor they will try to keep their lateral position even if the helicopter is tilted out of an initial horizontal position. As described above the swash plate assembly can tilt freely in all directions with respect to the rotor shaft (3) while they are connected to the tilt links (8) controlling the blade pitch. The result is that if the helicopter is tilted out of its initial horizontal position by e.g. a wind gust the flybars (6) will continue to spin in the horizontal plane. The flybars (6) and swash plate assembly have now a tilted path with respect to the rotor shaft (3) introducing a cyclic change in blade pitch as the rotor rotates. Because of the position of the pitch link connection points in the rotating swash plate (4), the blade pitch will now reach a maximum (and a minimum on the opposite side) at a position that creates an aerodynamic tilting moment directly opposing the initial disturbance. The helicopter is thereby tilted back to its initial horizontal position and the rotor and the flybars are again rotating parallel (in the horizontal plan) with no further cyclic changes in blade pitch.

For this stability function to work properly it is important that the whole simplified swash plate assembly can tilt more or less freely without being hold in place by traditional servos. The position of the pitch link connection points in the rotating swash plate (4) with respect to the longitudinal axis of the rotor blades (1) is described in more detail below and is important if passive stability is wanted. This position normally requires testing and tuning before passive stability is obtained.

In an extended embodiment of the present invention, the tilting of the non-rotating swash plate (9) is controlled by two magnetic actuators (10) connected to which by respective pitch and roll links (11). The pitch and roll links (11) are coupled to the non-rotating swash plate (9) by hinge connections, each at opposite points of an axis in the forward/backward direction going through the rotor shaft (3) and the centre of the non-rotating swash plate (9). The pitch/roll links (11) are in their opposite ends also hinged to the magnetic actuators (10). The pitch/roll links (11) are arranged to be substantially parallel with the rotor shaft (3), and the magnetic actuators (10) provide a respective force in their longitudinal directions which are independent from each other. The total force on the non-rotating swash plate (9) from the magnetic actuators (10) is therefore the sum of the independent forces from each of the magnetic actuators (10). The magnetic actuators (10) can be comprised of a coil surrounding a movable permanent magnet with an arm which is connected to the pitch link. The magnetic actuators (10) are thereby able to control the force of its associated pitch link depending on the current is in the coil. The current running trough the coils are the results of control inputs from a pilot, via e.g. a radio transmitter to a receiving device (in the helicopter) that outputs corresponding electric current to the coils.

It is also important to notice that the magnetic actuator (10) outputs a force trough the movable permanent magnet and arm, but the force is more or less independent of the position of the movable permanent magnet and the arm. Because of this important feature it is possible for the flybars (6) and the swash plate assembly to "take control" over the positions of the arms in the magnetic actuators (10). This is an essential part of the present invention that enables the flybars (6) to be mounted directly on the rotating swash plate (4). If the swash plate assembly had been controlled in a traditional way by servos (controlling the position of its output arm) this would not have been possible.

As will be apparent from the following description, the magnetic actuator positioned on the left hand side of forward/backward axis relative to forward direction will control the pitch of the aircraft, and the magnetic actuator positioned on the right hand side of forward/backward axis relative to forward direction will control the roll of the aircraft. The left hand side magnetic actuator is therefore denoted as the pitch actuator and the right hand side magnetic actuator is denoted as the roll actuator.

The result of the force chain throughout the above described rotor assembly is that when a force e.g. is acting in the upward direction from the pitch actuator, the pitch link will push on the non-rotating swash plate (9) accordingly, and the rotating swash plate (4) is exposed to the same force upwards. Because the flybars (6) are mounted directly on the rotating swash plate (4) this assembly is a gyroscope and as described earlier, any force acting on it results in a corresponding tilting about 90 degrees later. As can be seen from FIGS. 1 and 2, since the tilt links (8) are connected to the rotor head (2) near its centre, and the rotor blades (1) jointly tilt around its longitudinal axis, but not around its transversal axis, a force in the upward direction from the pitch actuator through the swash plate and the tilt link (8) will provide a maximum blade pitch some rotating angle after the rotor blade (1) has passed the actuator causing the upward force. A force from the pitch actuator acting in the downward direction will have the opposite effect on the swash plates and blade pitch at the same rotor position.

Figure 3:
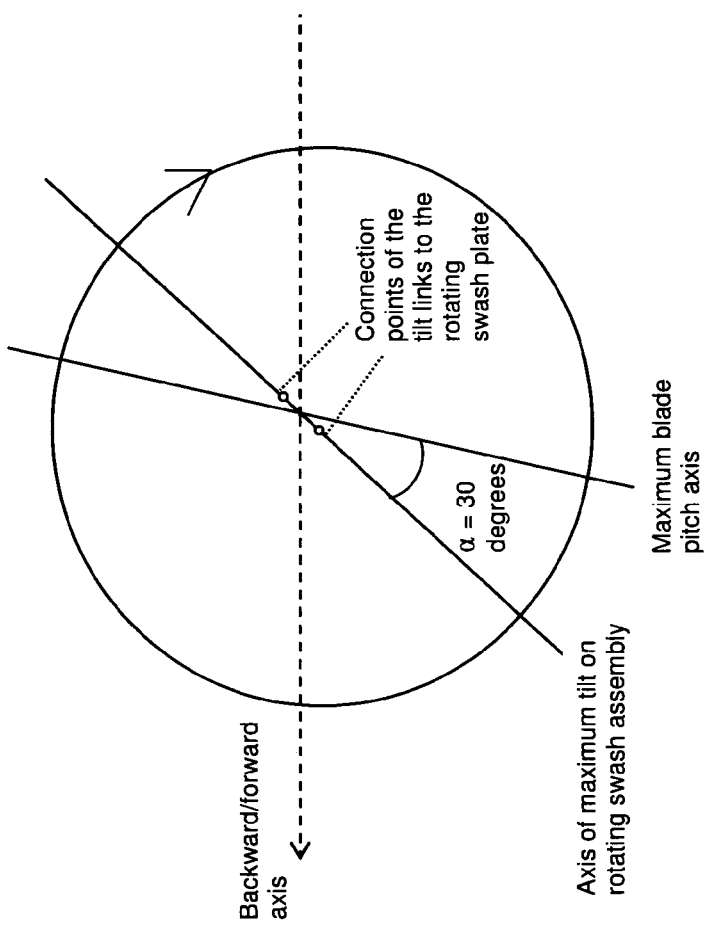
FIG. 3 is a schematic view of the relation between the longitudinal axis of the rotor blades and an axis created by the connections points connecting the tilt links to the swash plate assembly.

The position of the blades in the rotation plane is in a rotor assembly according to the present invention about 30 degrees behind the axis created by the connection points of the tilt links to the rotating swash plate (4). A moment of maximum blade pitch appears as the connection points of the tilt links to the rotating swash plate (4) are in line with an axis of maximum tilt on the rotating swash assembly. This situation is illustrated in FIG. 3. At this moment, the tilt links provide maximum positive blade pitch on one of the blades during a rotation and negative blade pitch on the opposite blade.

Figure 4:
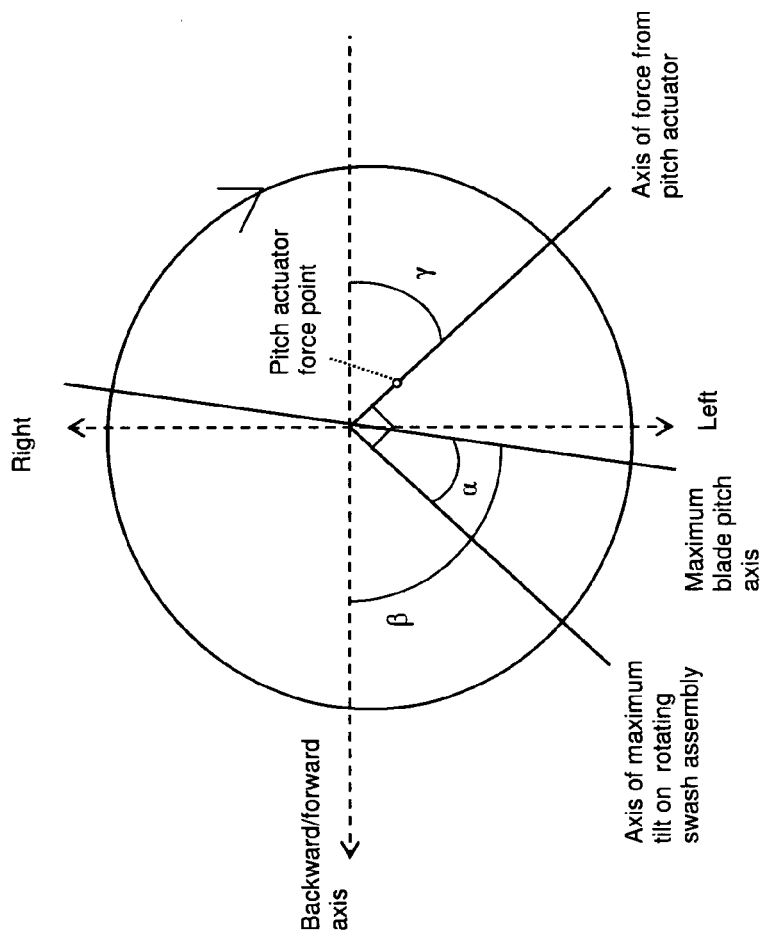
FIG. 4 is a schematic view of the relations between the force provided by a pitch actuator and the pitch in the rotational plane according to the present invention.

The course of events from providing a force from the pitch actuator to a pitch movement of the aircraft, to which the rotor assembly is attached, is shown more schematically in FIG. 4, illustrating the rotating direction and lags in the rotational plane. The horizontal doted line indicates the forward/backward axis, which is the longitudinal axis of the aircraft. The forward direction of the aircraft and the rotation direction of the rotor assembly are respectively indicated by arrows. The pitch actuator has an axis of force about 45 degrees (γ) to the left of the backward/forward axis in the clockwise rotational direction. Assuming an upward force provided by the actuator, the corresponding maximum upward tilt on the rotating assembly will, as discussed earlier, occur about 90 degrees later in the rotational direction due to gyroscopic precession. When the connection points of the tilt links to the rotating swash plate (4) are in line with this maximum upward tilt on the rotating assembly as indicated in FIG. 4, the tilt links then provide maximum blade pitch. The position of the maximum blade pitch axis depends on the angle of the axis created by the connection points of the tilt links to the rotating swash plate and the longitudinal axis of the blades (denoted α). α is in this case about 30 degrees, so the position of the maximum blade pitch is consequently (45+90-30) 105 degrees to the left of the backward/forward axis in the clockwise rotational direction. The upward force from the pitch actuator will thereby, trough the increased blade pitch, create an increased lift on the left side rotor blade, and a corresponding reduced lift on the right side rotor blade.

However, the reduced and increased lift on each of the blades does not give an instant pitch effect on the load connected to the rotor assembly. On any rotor system there is a delay between the point in rotation where a change in blade pitch is introduced and the point where the desired change is manifest in the rotor being tilted. This is often referred to as phase lag and is caused by gyroscopic precession (the same gyroscopic effect mentioned above) acting on the rotor itself. The phase lag varies with the rotor geometry, RPM and weight, stiffness of the rotor assembly and the weight of the aircraft, but is never more than 90 degrees. In the example of FIG. 4, this angle is denoted β and is approximately 75 degrees. Assuming that the forward/backward axis of the aircraft to which the rotor assembly is attached runs between the two actuators and passes through the centre of the swash plates (and the rotor shaft), the above described incident with an upward pitch actuator force causes the aircraft to pitch backward. In the case of a downward force provided by the same actuator as referred to above, the tilting of the rotor assembly would work corresponding oppositely, and the aircraft would have pitched forwards, still assuming a clockwise rotation of the rotor blades.

In general terms the angle between the forward/backward axis and the axis of force provided by the pitch actuator can be denoted γ. The angle between the axis of force provided by the pitch actuator and the axis of maximum upward tilt on the rotating assembly is close to 90 degrees. The angle between the axis of maximum upward tilt on the rotating assembly and the axis where the rotor blades are in the position of maximum blade pitch is, as described above, denoted α. The angle between the maximum blade pitch axis and the axis of maximum pitch effect on the aircraft is denoted β. From the description above, it is obvious that to obtain an optimal pitch effect on the aircraft controlled by the pitch actuator, the axis of maximum pitch effect and the forward/backward axis should be approximately concurrent. This implies that γ+90−α+β should approximately equal 180 degrees. γ can easily be adjusted by positioning the actuator at a proper angle relative to the forward/backward axis, while α depends on the selected arrangement for force transmission from the rotating swash assembly to the blade pitch movement. In the example of FIG. 1, α is approximately 30 degrees. β (the phase lag) is more difficult to determine as it varies with the rotor geometry, RPM and weight, stiffness of the rotor assembly and the weight of the aircraft. Normally the easiest way of determining β is trough actual test on a new rotor assembly. It is typically in the range of 65-85 degrees.

In a different helicopter with a very rigid rotor system, the phase lag β might only be 70 degrees and the angle α maybe 35 degrees (due to the design of the swash plate assembly). The resulting angle γ would then be about 55 degrees instead of 45 degrees as described above. This would mean that the pitch actuator in such a case should be moved more to the left side compared to the example shown in FIGS. 1 to 5.

Figure 5:
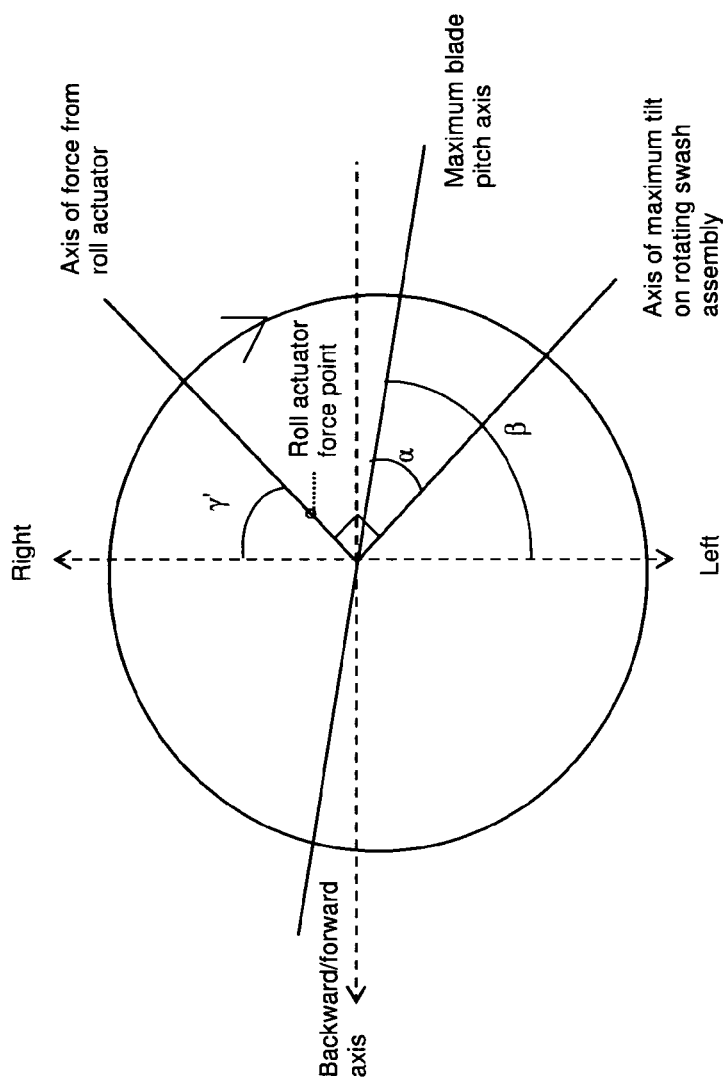
FIG. 5 is a schematic view of the relations between the force provided by a roll actuator and the roll in the rotational plane according to the present invention.

For the roll actuator's effect on the aircraft's roll, the exact same assumptions as for the pitch actuator can be done, only shifted 90 degrees. This is illustrated in FIG. 5. The vertical doted line indicates the left/right axis, which is the traversal axis of the aircraft. The left and right direction of the aircraft and the rotation direction of the rotor assembly are respectively indicated by arrows. The angle between the left/right axis and the axis of force provided by the roll actuator is denoted γ'. The angle between the axis of force provided by the roll actuator and the axis of maximum tilt on the rotating swash assembly is about 90 degrees.

The angle between the axis of maximum tilt on the rotating swash assembly and the axis where the rotor blades are in the position of maximum blade pitch provided by the roll actuator (the maximum blade pitch axis) is still denoted α. The angle between the maximum blade pitch axis and the axis of maximum roll effect on the aircraft provided by the roll actuator is still denoted β. From the description above, it is obvious that to obtain an optimal roll effect on the aircraft controlled by the roll actuator, the axis of maximum roll effect and the left/right axis should be approximately concurrent. This implies that γ'+90−α+β should approximately equal 180 degrees. γ' can easily be adjusted by positioning the roll actuator at a proper angle relative to the left/right axis.

As described earlier, an important feature of the magnetic actuators is: Magnetic actuators only provide a force output not a position output. As we use the roll actuator to induce a movement in the swash plate assembly 90 degrees later (due to gyroscopic precession), we can clearly see that such a movement require the pitch actuator to also move. A force output from the roll actuator results in a movement in the pitch actuator and a force output from the pitch actuator results in a movement in the roll actuator. As can be easily understood, this would not have been possible if the tilting of the swash plate assembly had been performed by forces from traditional servos that also control the position of the pitch/roll links.

The nature of the rotor assembly described above provides passive stability to any helicopter vehicle allowing it to be operated without any pitch or roll control. Just as important is it that this new system allows easy and precise roll and pitch control by independent forces that can be provided e.g. by simple magnetic coil actuators. The actuators can in turn be controlled via radio link from a remote control unit with sticks for pitch and roll control. There is no need for precise servo mechanisms and thus the rotor assembly according to the present invention is simpler, has lower weight and can be manufactured at a lower cost than existing systems.

The invention claimed is:

1. A rotor assembly comprising:
a rotor shaft and at least two flexible rotor blades coupled to a rotor head that is rotationally coupled to the rotor shaft, each rotor blade extending outwards from the rotor shaft such that the rotor head and the at least two rotor blades together define a longitudinal axis;
a rotating swash plate defining a centre through which the rotor shaft runs, the rotating swash plate having at least three flybars extending from the rotating swash plate and being symmetrically distributed around the centre of the rotating swash plate, each of the at least three flybars having an outer tip provided with a weight element, the swash plate being rotationally coupled to and synchronized with the rotor shaft and adjusted to tilt in all directions relative to a plane perpendicular to the rotor shaft;
a non-rotating swash plate defining a centre through which the rotor shaft runs, the non-rotating swash plate being adjustable to tilt in all directions relative to a perpendicular plane of the rotor shaft with tilting movements synchronized with the rotating swash plate; and
a plurality of wheels disposed about the rotating swash plate, the plurality of wheels contacting a surface of the non-rotating swash plate,
wherein the rotor head is hinged to the rotor shaft in one direction so that the rotor head and the rotor blades jointly are able to tilt around their concurrent longitudinal axis, but not around their traversal axis, and the rotating swash plate is directly coupled to the rotor head by two tilt links being hinged to both the rotating swash plate and the rotor head, one at each side of the longitudinal axis of the rotor head, providing synchronized tilt movements between the rotor head and the rotating swash plate around the longitudinal axis of the rotor head.

2. The rotor assembly according to claim 1, further comprising a roll link having a first and a second end, the first end of the roll link hinged to the non-rotating swash plate at a second connection point on the non-rotating swash plate and the second end of the roll link hinged to the pitch actuator, the roll link being movable in a direction generally parallel to the rotor shaft causing the non-rotating swash plate to tilt accordingly.

3. The rotor assembly according to claim 1, wherein the rotor assembly is coupled to a helicopter body having a forward/backward axis along its longitudinal axis, wherein the pitch link and the first connection point are positioned relative to the forward/backward axis so that $$\gamma+90-\alpha+\beta=180$$

where γ is the angle between the forward/backward axis and the first connection point on the non-rotating swash plate in the rotational plane of the rotor assembly, α is the angle between the longitudinal axis of the rotor head and an axis created by the two connection points of the tilt links to the rotating swash plate, and β is the angle of phase lag associated with the rotor assembly.

4. The rotor assembly according to claim 3, wherein the pitch actuator comprises a coil surrounding a movable permanent magnet with an arm connected to the pitch link allowing control of the force of the pitch link depending on the current in the coil.

5. The rotor assembly according to claim 2, the rotor assembly being coupled to a helicopter body having a left/right axis along its traversal axis, wherein the roll link and the second connection point are positioned relative to the left/right axis so that $$\gamma'+90-\alpha+\beta=180$$

where γ' is the angle between the left/right axis and the second connection point on the non-rotating swash plate in the rotational plane of the rotor assembly, α is the angle between the longitudinal axis of the rotor head and the axis created by the two connection points of the tilt links to the rotating swash plate, and β is the angle of phase lag associated with the rotor assembly.

6. The rotor assembly according to claim 5, wherein the roll actuator comprises a coil surrounding a movable permanent magnet with an arm connected to the roll link allowing control of the force of the roll link depending on the current in the coil.

\* \* \* \* \*